United States Patent Office 3,510,241
Patented May 5, 1970

3,510,241
COLORATION OF AROMATIC POLYESTERS
Chi K. Dien, Buffalo, N.Y., assignor to Allied Chemical Corporation, New York, N.Y., a corporation of New York
No Drawing. Filed Nov. 16, 1966, Ser. No. 594,662
Int. Cl. D06p 3/12
U.S. Cl. 8—4         7 Claims

ABSTRACT OF THE DISCLOSURE

Method for dyeing shaped materials of aromatic polyesters, e.g., polyethylene terephthalate fibers and films, with an aqueous dispersion of a 2,2'(azo-di-arylene)-bis-benzothiazole dyestuff by a thermal fixation procedure and the colored product thereof.

---

This invention relates to the coloration of aromatic polyesters. It relates more particularly to the use of a special class of azo-bis-benzothiazole compounds as coloring agents for aromatic polyesters and fibrous material containing aromatic polyesters, and to the resulting polyesters and fibrous material colored with said compounds.

Aromatic polyester materials of the type contemplated in this invention consist of highly polymeric linear esters of terephthalic acid and glycols of the series HOROH wherein R is a polymethylene chain of 2 to 10 carbon atoms or 1,4 cyclohexane dialkylene radical. Such polyesters are obtainable, for example, by the reaction under polymer forming conditions of terephthalic acid, or an ester-forming derivative thereof with ethylene glycol, trimethylene glycol, tetramethylene glycol, hexamethylene glycol, decamethylene glycol or 1,4 - dimethylol cyclohexane. The polymers are available commercially in the form of foils, fabrics, and particularly fibers. Linear polyalkylene terephthalate fibers which are sold as filaments, yarns and in various textile forms are of increasing importance in view of their ready availability and outstanding utility as textile materials. A method of producing polyethyl terephthalate fiber is disclosed in U.S. Patent 2,465,319 to Whinfield and Dickson. The use of synthetic materials and particularly aromatic polyester material of the polyalkylene terephthalate type, which is characterized by excellent strength, resistance to creasing, to shrinking, and to stretching, and excellent washability is increasing. The growing utilization of these synthetic fibers has led to a corresponding increased demand for dyestuffs suitable for coloring such material. Polyester material has been difficult to dye satisfactorily since it has poor affinity, generally, for most of the known classes of dyestuffs, and does not readily absorb liquids. Although some new dyes have been created and special dyeing techniques have been developed to render the known dyes more suitable for the new fibers, for the most part the new dyes and special dyeing techniques have been deficient in one or more of the properties required for satisfactory commercial coloring such as fastness to light, fastness to sublimation, fastness to washing, good color hue and brightness.

It is an object of the present invention to provide yellow to orange colored aromatic polyester material in bright shades possessing good fastness properties.

Another object of this invention is the provision of a class of dyestuffs for dyeing aromatic polyester material of the polyalkylene terephthalate type bright yellow to orange shades possessing excellent fastness properties, particularly to sublimation, washing and light.

Still another object of the present invention is to provide a method for dyeing aromatic polyester material of the polyalkylene terephthalate type with a new class of dyestuffs which is applied by the heat fixation or "Thermosol" dyeing procedure and which produces dyed material having outstanding fastness to sublimation.

As employed herein the term "dyeing" includes various dyeing and printing procedures and the term "dyed" includes colored material produced by dyeing and printing procedures.

I have discovered that valuable dyeings possessing good fastness properties are produced on aromatic polyester material of the linear polyalkylene terephthalate type, and particularly polyethylene terephthalate, by applying to said material a 2,2'(azo-diarylene)-bis-benzothiazoles of the formula:

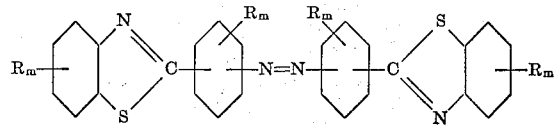

wherein the R's are alike or different and each R may be hydrogen, lower alkyl, lower alkoxy, halogen, nitro, N,N-di-lower alkyl carbamoyl or N,N-di-lower alkyl sulfamyl, and $m$ is an integer of 1–4.

The terms, "lower alkyl," "lower alkoxy," etc. include groups having branched and straight hydrocarbon chains of 1 to 5 carbon atoms.

The compounds represented by the above formula can be prepared by known methods. For example, 2,2'(azo-di-p-phenylene)-bis-(6-methylbenzothiazole) is obtained by oxidation of dehydrothio-p-toluidine with sodium hypochlorite followed by reduction of the azoxy compound produced as described in Helvetica Chimica Acta 27, 1–8 (1944). Likewise, 2,2'(azo - di - p-phenylene)-bis-benzothiazole is obtained by oxidation of 2-(4'-aminophenyl) benzothiazole with sodium hypochlorite followed by reduction of the azoxy compound with sodium sulfide.

Other representative dyestuffs of this class include:
2,2'-(azo-di-p-phenylene)-bis-(6-chloro-4-methylbenzothiazole)
2,2'-(azo-di-m-tolylene)-bis-(4-methoxy-6-methylbenzothiazole)
2,2'-(azo-di-nitrophenylene)-bis-benzothiazole
2,2'-(azo-di-p-phenylene)-bis-(6-methyl-4,N,N-diethylsulfamylbenzothiazole)
2,2'-(azo-di-p-phenylene)-bis-(6-ethoxybenzothiazole)
2,2'-(azo-di-p-phenylene)-bis-(4-bromo-6-isopropoxybenzothiazole)
2,2'-(azo-di-p-phenylene)-bis-(3,5,6-trichloro-4-methylbenzothiazole)
2,2'-(azo-di-p-phenylene)-bis-(3,5,6-trimethylbenzothiazole)
2,2'-(azo-di-3-chloro-m-tolylene)-bis-(6-methylbenzothiazole)
2,2'-(azo-2,4-dimethyl-3-bromophenylene)-bis-(6-methylbenzothiazole)

According to our invention a 2,2'-(azo-di-arylene)-bis-benzothiazole is applied in disperse form to an aromatic polyester of the terephthalate type by means of a thermal fixation or "Thermosol" procedure. Surprisingly, application of said bis-benzothiazoles by means of a thermal fixation procedure produces polyester in bright shades having excellent fastness properties, although this class of dyestuffs has no affinity for said polyester when a carrier or a pressure dyeing procedure is employed.

It is a feature of the present invention that the azo-diarylinebenzothiazoles do not require any special techniques or unusual apparatus for their successful application to said material, which may be in the form of fibers, films, woven and knitted materials and the like. These dyestuffs are water-in-soluble or at most slightly soluble in water and hence they are applied from aqueous dispersions in the manner of the well-known "disperse dyes." Thus, they may be conditioned by the various methods heretofore described as useful for the preparation of water insoluble dyes normally used for the dyeing and printing of polyester material.

The dyeing of textile fibrous material formed of terephthalate polyesters of the type referred to above is advantageously carried out by working the fibrous material in a bath containing a dispersion of one or more of the (azodiarylene)-bis-benzothiazoles. The undyed material is impregnated at a temperature below about 60° C. with the aqueous dispersion of the dyestuff which may contain up to about 50% of urea and a thickening agent, such as sodium alginate. The impregnated material is squeezed to remove the excess liquor and dried, advantageously in a current of warm air, and the dyestuff is fixed by subjecting the dyestuff-impregnated material to heat, usually between about 180° and about 210° C.

The process of this invention is suitable also for the dyeing of fabrics and fibers comprising mixtures of aromatic polyesters and one or more fibers such as wool, cotton and the like. The dyeing of such mixtures is carried out in the conventional manner. For example, in dyeing polyester-wool mixtures, the wool component is protected by a reserve agent and after completion of the dyeing of the aromatic polyester component, the undyed wool may be colored with a wool dyestuff. Similarly polyester-cotton mixtures can be dyed by the simultaneous application of a dyestuff of the class described herein and a conventional cotton dyestuff or these agents can be applied sequentially in any order.

The azodiarylenebenzothiazoles used in the process of the present invention can be converted to readily dispersable powders useful as disperse dyes by admixing them with one or more of the usual dispersing agents, such as sulfonated lignin containing sodium sulfonate groups or similar sulfate cellulose waste liquor products, formaldehyde condensation products of naphthalene β-sulfonic acid, formaldehyde condensation products of alkylnaphthalene sulfonates, polymerized naphthalene sodium sulfonate, etc., grinding the mixture in the presence of water, drying the dispersed product and grinding the dried product. Other dispersing procedures can be used, as will be obvious to those skilled in the art. It is usually advantageous to use a mixture of dispersing agents to obtain readily a desired combination of properties with respect to the characteristics of melting, dispersing, non-migrating, etc.

More specific information on the methods of dyeing aromatic polyesters is disclosed in "Principles of Dyeing 'Dacron' Polyester Fiber" in American Dyestuff Reporter 41 (1952) 860;
"Thermosol Method of Dyeing" in American Dyestuff Reporter 42 (1953) 1, and
"Dyeing of 'Dacron' Polyester Fiber—Evaluation of Dyeing Assistants," in DuPont Technical Bulletin, 8 No. 2 (June 1952), 69.

The amount of dyestuff employed will depend upon the depth of coloration desired. For example, in the dyeing of polyethylene terephthalate fibers, amounts of 2,2'-(azodi-p-phenylene)-bis-(6 - methylbenzothiazole) ranging from about 0.01% or less to about 20% or more of the weight of the fiber may be employed to obtain pastel to heavy or deep shades.

The invention will be illustrated by the following specific examples in which the parts are by weight and the temperatures are in degrees centigrade.

EXAMPLE 1

A mixture of 5 parts of 2,2'-(azo-di-p-phenylene)-bis-(6-methylbenzothiazole), 5 parts of a commercial formaldehyde condensation product of β-naphthalene sodium sulfonate ("Tamol N") 50 parts of Ottawa Sand and 90 parts of water was ground for about 16 hours. The sand was filtered from the dispersed liquid mixture. The latter was used to dye polyethylene terephthalate material by the Thermosol procedure in bright yellow shades which had excellent fastness to washing, light and sublimation.

EXAMPLE 2

A mixture of 16 parts of 2,2'-(azo-di-p-phenylene)-bis-(6-methylbenzothiazole), 2 parts of "Tamol N" and 100 parts of water was ground with 50 parts of Ottawa Sand for about 16 hours. The sand was filtered from the liquid dispersion and washed with 100 parts of water. After the addition of 20.5 parts of "Tamol N" and 22.3 parts of a commercial polymerized sodium alkylarylsulfonate ("Daxad" #23) the liquid dispersion was dried to constant weight (61.5 parts) at room temperature. This dried product was ground to a fine powder containing 26% of coal tar dye.

The dyestuff powder prepared in Example 2 was used to dye polyester material as follows:

To 10 parts of the dyestuff powder, about 4 parts of a commercial alkylaryl polyether ("Triton X–100") were added and the mixture was stirred well. Sufficient of a 0.2% aqueous sodium alginate solution was added to dilute the mass to 1000 parts, by volume, and the mass was agitated until a uniform mixture was obtained. This dispersion was padded onto polyethylene terephthalate cloth ("Dacron") in a conventional padder with the roll pressure adjusted to give a 65% pick-up. The cloth was partially dried by radiant heat to remove above 20 to 30% of the moisture and then completely dried over cans. The dried material was then subjected to a temperature of 210° for 60 seconds to fix the dyestuff on the material. The dyed material was scoured to remove any surface dyestuff in a bath containing

| | Oz./gal. |
|---|---|
| Triton X–100 | ¼ |
| Caustic soda, 30° Bé. | ⅛ |
| Sodium hydrosulfite | ⅛ |

The scouring was done at about 75° for about 5 minutes. The dyed material was rinsed well with warm water, dried and finished in a conventional manner.

The bright yellow dyed aromatic polyester material withstood 220 hours of exposure in a Fade-Ometer, which is indicative of the excellent fastness to light of the dyed polyester material (Test Method 16A–1964 AATCC Technical Manual).

Its sublimation fastness was excellent also. When tested by placing a swatch of dyed material between two pieces of undyed material in a Scorch Tester and submitted to a temperature of 200° for 30 seconds, practically no discoloration of the undyed material was noted.

Washing fastness tested according to AATCC Test Methods III and IV indicated excellent fastness to washing.

EXAMPLE 3

A mixture of 200 parts of an aqueous filter cake containing 43.6 parts of 2,2'-(azo-di-p-phenylene)-bis-(6-methylbenzothiazole), 226 parts of water, 120 parts of a commercial sodium lignin sulfonate ("Orzan S"), and 100 parts of "Ottawa Sand" was agitated at high speed for about 48 hours. After filtering the sand from the dispersed color slurry, the latter was spray dried.

The spray dried dispersed dyestuff thus obtained was used to dye a mixed fabric composed of 50% aromatic polyester ("Fortrel") and 50% cotton, by the Thermosol process. The mixture was padded with a dye liquor containing 5 oz./gal. of disperse dye and 3 oz./gal. of a commercial sodium salt of polymerized acrylic resin ("Acrysol GS") as dispersing agent. The material containing about 65% of the dye liquor was dried at 93° and then heated at 210° for 90 seconds. The material was soaped at 82° with a solution containing ½ oz./gal. of neutral soap and ½ oz./gal. of soda ash, rinsed well and dried. The polyester portion of the material was dyed a bright yellow shade, excellent fastness to sublimation, washing, dry cleaning solvents, and Koratron treatment. The cotton portion was stained somewhat but on-tone with the polyester shade.

Thus, aromatic polyester material of the polyalkylene terephthalate type having bright shades of excellent fastness properties have been provided by the application of a dispersed form of a member of the class of 2,2'-(azo-di-arylene)-bis-benzothiazoles to said fibrous material by the "Thermosol" or thermo fixation procedure. The brightness of the shade and the excellent fastness of the colorations obtained are highly surprising, particularly since it has been found that this class of dyestuffs possessed no affinity for aromatic polyesters of the polyalkylene terephthalate type when dyed by the carrier or pressure dyeing methods.

I claim:

1. Aromatic polyester of the polyalkylene terephthalate type colored with a 2,2'-(azo-di-arylene)-bis-benzothiazole.

2. Aromatic polyester as defined in claim 1 wherein said 2,2'-(azo-di-arylene)-bis-benzothiazole is of the formula

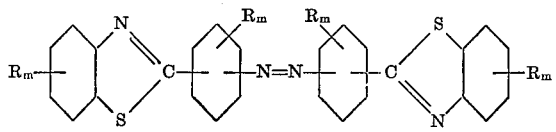

wherein each R may be hydrogen, lower alkyl, lower alkoxy, halogen, nitro, N,N-di-lower alkyl carbamoyl, and N,N-di-lower alkyl sulfamyl and $m$ is an integer of 1–4.

3. Aromatic polyester as defined in claim 1 wherein said 2,2'-(azo-di-arylene)-bis-benzothiazole is 2,2'-(azo-di-p-phenylene)-bis-(6-methylbenzothiazole).

4. A method for dyeing aromatic polyesters of the polyalkylene terephthalate type which comprises impregnating said polyester with an aqueous dispersion of a dyestuff consisting essentially of a 2,2'-(azo-di-arylene)-bis-benzothiazole, drying the dye-impregnated polyester, and subjecting the dye-impregnated polyester to heat to fix said dyestuff.

5. A method as defined in claim 4 wherein said dyestuff is of the formula:

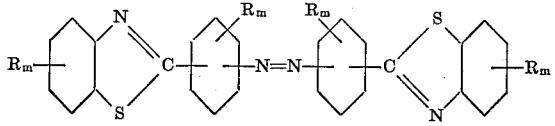

wherein each R may be hydrogen, lower alkyl, lower alkoxy, halogen, nitro, N,N-di-lower alkyl carbamoyl, and N,N-di-lower alkyl sulfamyl and $m$ is an integer of 1–4.

6. A method as defined in claim 4 wherein said dyestuff is 2,2'-(azo-di-p-phenylene)-bis-(6-methylbenzothiazole).

7. A method as defined in claim 6 wherein said polyester is impregnated with a dispersion of 2,2'-(azo-di-p-phenylene)-bis-(6-methylbenzothiazole) at a temperature below about 60° C. and wherein the dye-impregnated polyester is subjected to a temperature of about 180° C. to about 210° C. to fix said dyestuff.

References Cited

UNITED STATES PATENTS

| | | | |
|---|---|---|---|
| 2,368,658 | 2/1945 | Haddock | 260—158 X |
| 2,868,775 | 1/1959 | Straley et al. | 260—158 X |
| 3,341,139 | 9/1967 | Wegmuller et al. | 8—55 X |

NORMAN G. TORCHIN, Primary Examiner

T. J. HERBERT, JR., Assistant Examiner

U.S. Cl. X.R.

8—41, 55; 260—158